US008213984B2

(12) United States Patent
Fiori, Jr.

(10) Patent No.: US 8,213,984 B2
(45) Date of Patent: Jul. 3, 2012

(54) AUXILIARY INTERFACE APPARATUS

(76) Inventor: David Fiori, Jr., Bensalem, PA (US)

( * ) Notice: Subject to any disclaimer, the term of this patent is extended or adjusted under 35 U.S.C. 154(b) by 1456 days.

(21) Appl. No.: 11/478,391

(22) Filed: Jun. 28, 2006

(65) Prior Publication Data

US 2008/0002275 A1 Jan. 3, 2008

(51) Int. Cl.
*H04M 1/00* (2006.01)

(52) U.S. Cl. .................. 455/556.1; 455/3.04; 455/3.06; 455/344; 455/335; 455/346

(58) Field of Classification Search .......... 455/344-347, 455/556.1, 557, 569.2, 99, 575.9, 90.3, 3.04, 455/3.06, 66.1, 550.1
See application file for complete search history.

(56) References Cited

U.S. PATENT DOCUMENTS

| | | | | |
|---|---|---|---|---|
| 6,622,083 | B1 * | 9/2003 | Knockeart et al. | 701/202 |
| 6,895,238 | B2 * | 5/2005 | Newell et al. | 455/414.2 |
| 6,937,732 | B2 * | 8/2005 | Ohmura et al. | 381/86 |
| 6,996,390 | B2 * | 2/2006 | Herley et al. | 455/345 |
| 7,062,238 | B2 * | 6/2006 | Glaza | 455/161.1 |
| 7,190,798 | B2 * | 3/2007 | Yasuhara | 381/86 |
| 7,215,950 | B2 * | 5/2007 | Mazzara et al. | 455/418 |
| 7,343,141 | B2 * | 3/2008 | Ellis et al. | 455/132 |
| 7,400,610 | B2 * | 7/2008 | Malkemes et al. | 370/338 |
| 7,574,177 | B2 * | 8/2009 | Tupman et al. | 455/90.3 |
| 7,787,903 | B1 * | 8/2010 | Myers | 455/556.1 |
| 7,917,081 | B2 * | 3/2011 | Voto et al. | 455/3.02 |
| 2004/0091123 | A1 * | 5/2004 | Stark et al. | 381/86 |
| 2004/0151327 | A1 | 8/2004 | Marlow | |
| 2004/0205153 | A1 * | 10/2004 | Weisshaar et al. | 709/217 |
| 2006/0093155 | A1 | 5/2006 | Fiori | |
| 2007/0015537 | A1 * | 1/2007 | DeBiasio et al. | 455/556.1 |

* cited by examiner

*Primary Examiner* — Pablo Tran

(57) ABSTRACT

An auxiliary interface device, comprising an electronic circuit to interface to the signal output of a signal source, said signal source developing or receiving more than one signal, and providing for the user selection of at least one of the signals in deference to the others so that said apparatus provides for the selection of at least one special signal having predetermined characteristics, a detector which recognizes the presence of the at least one said special signal when present or part of a signal developed by the apparatus to which said auxiliary interface device is connected, said detector being able to distinguish between said at least one special signal and other signals ordinarily present or developed by the apparatus to which said auxiliary interface device is interfaced, a signal switch to substitute at least one auxiliary signal in place of a signal output by the apparatus to which said auxiliary interface is interfaced, said signal switch being configured to substitute said at least one auxiliary signal for the signal normally developed by said apparatus to which said auxiliary interface device is interfaced when said detector recognizes the presence of the at least one special signal in the signal normally developed by said apparatus to which said auxiliary interface device is interfaced.

16 Claims, 4 Drawing Sheets

Universal Auxiliary Interface
Applied to Head Unit with Variable Level External Amplifier

Universal Auxiliary Interface

Applied to Head Unit with Variable Level External Amplifier

Universal Auxiliary Interface
Applied to an OEM Head Unit with Constant Level External OEM Amplifier

AUXILIARY INTERFACE APPARATUS

FIELD OF THE INVENTION

The present invention provides utility in connection with the user interface of signal development and handling systems that are able to provide for the selection of alternative signal sources.

BACKGROUND OF THE INVENTION

Automobile audio system control units, usually referred to as "head units", often include built in facilities for selectively receiving a multitude of broadcast radio signals, playing cassette tapes and, selectively playing a multitude of programs on a Compact Discs (CD). Such head units also include facilities for the user to select from among their different signal sources. The present invention makes it possible for such head units to be used to select additional signal sources, such as, for example, a portable MP3 player or the audio signal from a Digital Video Disc (DVD) without additional user interface facilities such as external switches, controls or any user control capability other than those already present on the car radio head unit. When so selected, the present invention directs the signal from an additional signal source directly to the speaker amplifier part of an audio system and then to the speakers. In this way the signal from the additional signal source is not subject to any effect or corruption that might otherwise be introduced by the head unit's intrinsic signal processing electronics. The present invention enables such additional selections by the use of either a special tape, a special CD, or by a local AM or FM radio signal modulator—a device that is able to introduce a locally supplied special signal in a way that can be selected and demodulated as an AM or FM radio signal—or by way of any signal media or source that can be selected with controls provided ppby the automobile's head unit.

Because audio systems, with their head units, are almost always supplied by the original automobile manufacturer as equipment that is an integral part of the automobile as it is manufactured, such Head Units are referred to as Original Equipment Manufacturer (OEM) head units. Such OEM head units are usually engineered to select from only a limited number of signal sources, most of which, if not all, are sources whose signals are developed and selected within the same modular unit. As a result, the signal selection circuits are not readily accessible to those who wish to apply such selection capabilities to other sources not provided for by the OEM's head unit.

Even though some OEM head units are in fact able to select from additional external sources, but in many cases such provisions will not ordinarily respond without corresponding digital remote control interface protocols. Such is the case with provisions for external CD changers, DVD players and Satellite radio receivers. Unfortunately, OEMs do not ordinarily release such digital remote control interface protocol details, and devices which are able to use such provisions are difficult and expensive to develop on account of the difficulty of reverse engineering such digital protocols. Even when such digital protocols are applied, additional difficulties are encountered when additional sources need to be selected over and above those protocols that are intended to handle. In such cases complicated sequences of user interaction are sometimes employed in conjunction with such digital protocols to expand upon the capabilities of the OEM head unit, as exemplified by the device described by U.S. Pat. Application No. 20040151327 to Ira Marlow and U.S. Pat. Application No. 20060093155 to David Fiori, Jr. and respectively.

Moreover, some such OEM head units provide for signal processing to compensate for the peculiarities of the speaker systems that are included with their cars. This can be a problem when different speakers are desired that do not exhibit the same, if any such peculiarities. In such cases it is desirable to process the signals in such a way as to remove such compensations and, if necessary, compensate for the peculiarities of the desired speakers instead.

In addition, the connection of external equipment to such OEM head units are often fraught with problems related to the pickup of interference such as automobile engine noises due mostly to the strong interfering magnetic fields and large ground currents created by the vehicle electrical system. In most cases such interference occurs as the result of extraneous noise currents flowing in connections cables that are commonly referred to as "ground loops". As such, signal interface conditioning may also be included to avoid such interference and to enable the other aspects of the invention without compromise.

The present invention makes it possible to use those same user selection capabilities to select signals from additional signal sources. Using signal control facilities often included with such user interfaces, the present invention can also control signal processing parameters applied to the development of signals such signal development and handling systems are able to provide. In addition, the present invention also has utility in providing for the application of all kinds of signal processing to said signals in a manner that can respond to any or all of the signal processing parameters such user interfaces may be able to effect with their intrinsic capabilities. The present invention is also able to apply such signal processing according to such processing parameters with improved performance or utility. For example, said processing could then be performed with increased accuracy or increased power as compared to the intrinsic capabilities of the signal development and handling circuits. In addition, the present invention can also be applied to expand upon the number of parameters and processes that may be specified by said signal development and handling system interface and applied to said signals. Interactive systems that multiply the utility of this invention can also be implemented when this invention is coupled with any user feedback display capabilities—especially text display capabilities—the signal development and handling system may provide. Last, but not least, undesirable signal processing parameters may also be estimated and then processing performed to compensate for and to remove such undesirable processing when the provision of signals normally developed by said signal development and handling system, without such processing, is desired.

The present invention also makes it possible for signal processing to be applied to additional source signal with the same effects any signal normally developed by the automobile head unit would normally be subject to. For example, some automotive head units emphasize bass frequencies as a function of the speed of the automobile so that the bass part of the signal can be heard over road noises which increase with the speed of the vehicle. This same emphasis could be applied by virtue of the present invention to selected additional signal sources, except that the emphasis would be applied by circuits that are part of the present invention and not part of the head unit so that they can be designed to perform with higher audio accuracy and fidelity than the circuits provided in the automobile head unit for performing the same function. Such emphasis could also be reduced or enhanced in degree of effect since the processing occurs in the circuits that are part of the device that implements this invention which can have provisions for the configuration of such effects.

Such signal processing could also include processing that is performed by the automotive head unit in response to controls provided for the adjustment of signal processing parameters by the user. In this way the present invention would permit the user's specification of such signal processing parameters as signal volume, bass tone, and treble tone emphasis or de-emphasis to be applied to the additional signals without subjecting them to the effects of the head unit's own signal processing circuitry. In this way such processing can be performed upon the additional source signals with greater accuracy and audio fidelity than the automobile head unit may be able to provide.

The present invention can also be applied to control different kinds of processing or different functions in the vehicle.

The present invention can perform actions in response to controls provided by the automobile head unit for the adjustment of other signal processing parameters by the user. Last, but not least, and more specifically, the present invention can be applied to control parameters related to the selection of programs in the device that is selected with controls provided by the head unit for other purposes. For example, an auxiliary selection mode can be engaged which uses the volume control to specify the selection of a particular song in an MP3 device.

In this way the present invention makes it possible for the head unit's volume control to be used to select from among different songs on an auxiliary device, in addition to or instead of its normal use as a volume control. Other controls provided for in said head unit may also be used in such a fashion as may occur to someone of ordinarily skill in the art. Moreover, such capabilities could be multiplied and enhanced when coupled with the popular Radio Data Broadcast System (RDBS) capabilities now provided with many OEM FM capable head units. When FM radio modulation is used to deliver the special signal to the head unit, that same FM radio signal may also include textual information related to the operation of the interface by way of the RDBS capabilities. Such information can enhance, expand and multiply the utility of the invention as such textual displays can provide instructions or other types of guidance related to the user's operation of the present invention and the operation of auxiliary devices the present invention provides for.

Last, but not least, in instances where the normal signal is developed by the head unit with processing that has undesirable characteristics, the present invention can be applied to compensate for such undesirable characteristics when the automobile's head units own normal source signals are selected by the user. This is the case as many head units are designed to provide emphasis or de-emphasis at specific frequencies to compensate for the characteristics of the audio speakers used by the car manufacturer. When different speakers with characteristics different from those for which the compensation was intended are used in such audio systems, such compensation detracts from instead of improving the audio fidelity of the audio system. The present invention can also address this problem by processing signals developed by the automobile head unit in such as way as to remove such compensations. This can be accomplished by analyzing the signal processing applied to an appropriately generated special signal when the special signal is selected. Then, when normal signals are selected, compensations can be applied according to that analysis.

SUMMARY OF THE INVENTION

An auxiliary interface device connects to a signal source apparatus which is able to provide for the selection and reproduction of a special signal. When the auxiliary device detects the presence of the special signal as determined by the normal operation of the apparatus, the auxiliary interface device substitutes an associated auxiliary signal in place of the special signal provided by the signal source apparatus.

Moreover, the auxiliary interface device may remove the substituted auxiliary signal and restore the signal normally provided by the normal operation of the signal source apparatus when the auxiliary device no longer detects the presence of the special signal.

In this way the said signal substitution is maintained as long as the auxiliary interface device detects the special signal, and said signal substitution is removed when the auxiliary interface no longer detects the special signal.

Once the signal substitution is made, other characteristics of the special signal may be determined. For example, the level of the special signal may be measured and used to specify a parametric value that corresponds to the value of the level control parameter applied by the subject signal source apparatus. For example, the value of the level control parameter which is normally specified by user interface controls provided for in typical head units, may also be used to permit the user to control various features of the enhanced system as may be obvious to someone of ordinary skill in the art. These may include, in addition to the control of volume in the enhanced system, the selection of songs in an MP3 player, for example.

More than one special signal may also be employed to permit the interface device to distinguish among more than one such special signal in the event it is desirable to select among more than one auxiliary sources or functions. In addition, the signal may also be engineered to permit the characterization of any signal processing performed by the subject system on the signal, once the special signal is selected by the subject system and detected by the auxiliary interface.

Once selected, the present device will then continuously monitor that special signal as output by the subject system while the remainder of the system uses the auxiliary signal. Then, if the subject system should select a different signal source other than one it is equipped to identify, the present device will then switch back the original signal as is provided by the subject system instead of the auxiliary signal previously switched into the signal pathway.

In addition, if the subject system should select another special signal that the present device is equipped to identify, the present device may then switch either an additional auxiliary signal source, or interpret such an identification as a signal to change some aspect of the processing applied to an auxiliary source, or provide further selection of programs a particular auxiliary source may be able to provide, or to engage special processing the auxiliary source may be able to provide.

When the present interface device switches an auxiliary signal source into the system's signal pathway, the subject system's normal signal pathway before the switching is entirely avoided. As such, any undesirable effect the subject system would have subjected the signal to up to the switching circuit may be avoided.

Moreover, since the present interface can be configured not only to monitor, but also to characterize any signal processing the subject system may specify, it may then apply the same signal processing as the subject system. In this way the auxiliary signal may then avoid any undesirable effect the subject system may introduce not only before, but also after the point where the present device switches the signal by substituting its own action for that of any part of the subject system.

Many OEM FM radios now include the ability to receive and display text information in addition to the normal FM program content. This capability is referred to as Radio Data Broadcast System (RDBS). Because any FM signal can include the RDBS signal, too, the utility of this invention when used in conjunction with an OEM FM radio receiver can be further enhanced. For example, the title of a musical selection from an MP3 player that is either selected or controlled through operation of this invention can be modulated along with the special signals in accordance with the RDBS signal so that RDBS capable OEM radios can display that information on their RDBS text displays. In this way it is also possible to display instructions pertinent to the operation of the present invention. Other uses of such textual display capabilities may be obvious to those of ordinary skill in this art.

Last, but not least, it is possible to develop all of the above functions entirely in the scope of a digital electronic computer system. While all of the examples in this disclosure pertain to physical electronic circuits, analogies of all of the necessary signal processing and detection electronics can be implemented in an appropriate micro computer, digital signal processor (DSP), or general purpose computer. Implementation of this invention with such computers would be obvious to someone of ordinary skill in such arts.

SUMMARY OF THE INVENTION

In the embodiment of claim 1, an auxiliary interface device, comprising an electronic circuit to interface to the signal output of a signal source, said signal source developing or receiving more than one signal, and providing for the user selection of at least one of the signals in deference to the others so that said apparatus provides for the selection of at least one special signal having predetermined characteristics, a detector which recognizes the presence of the at least one said special signal when present or part of a signal developed by the apparatus to which said auxiliary interface device is connected, said detector being able to distinguish between said at least one special signal and other signals ordinarily present or developed by the apparatus to which said auxiliary interface device is interfaced, a signal switch to substitute at least one auxiliary signal in place of a signal output by the apparatus to which said auxiliary interface is interfaced, said signal switch being configured to substitute said at least one auxiliary signal for the signal normally developed by said apparatus to which said auxiliary interface device is interfaced when said detector recognizes the presence of the at least one special signal in the signal normally developed by said apparatus to which said auxiliary interface device is interfaced.

In a further embodiment of Claim 12, the Interface device comprising electronic circuitry to interface to a signal output of a signal source apparatus, said signal source apparatus generating or receiving of a plurality of signals and permitting for the user selection of one of those signals, such that said apparatus allows for selection of a plurality of special signals, at least one detector to recognize and distinguish between each of said plurality of special signals to which said auxiliary interface device is interfaced, a plurality of switches operated in accordance with said at least one detector configured to substitute at least one auxiliary signal from among a plurality of auxiliary signals according to the presence of the special signal, and corresponding to said at least one special signal in place of a signal normally developed by or present in the apparatus to which said auxiliary interface is interfaced, said plurality of switches being operated so as to substitute one or more of said plurality of auxiliary signals when said detector recognizes the presence of one or more of said corresponding special signals.

DETAILED DESCRIPTION OF THE PREFERRED EMBODIMENT

Figure 4:
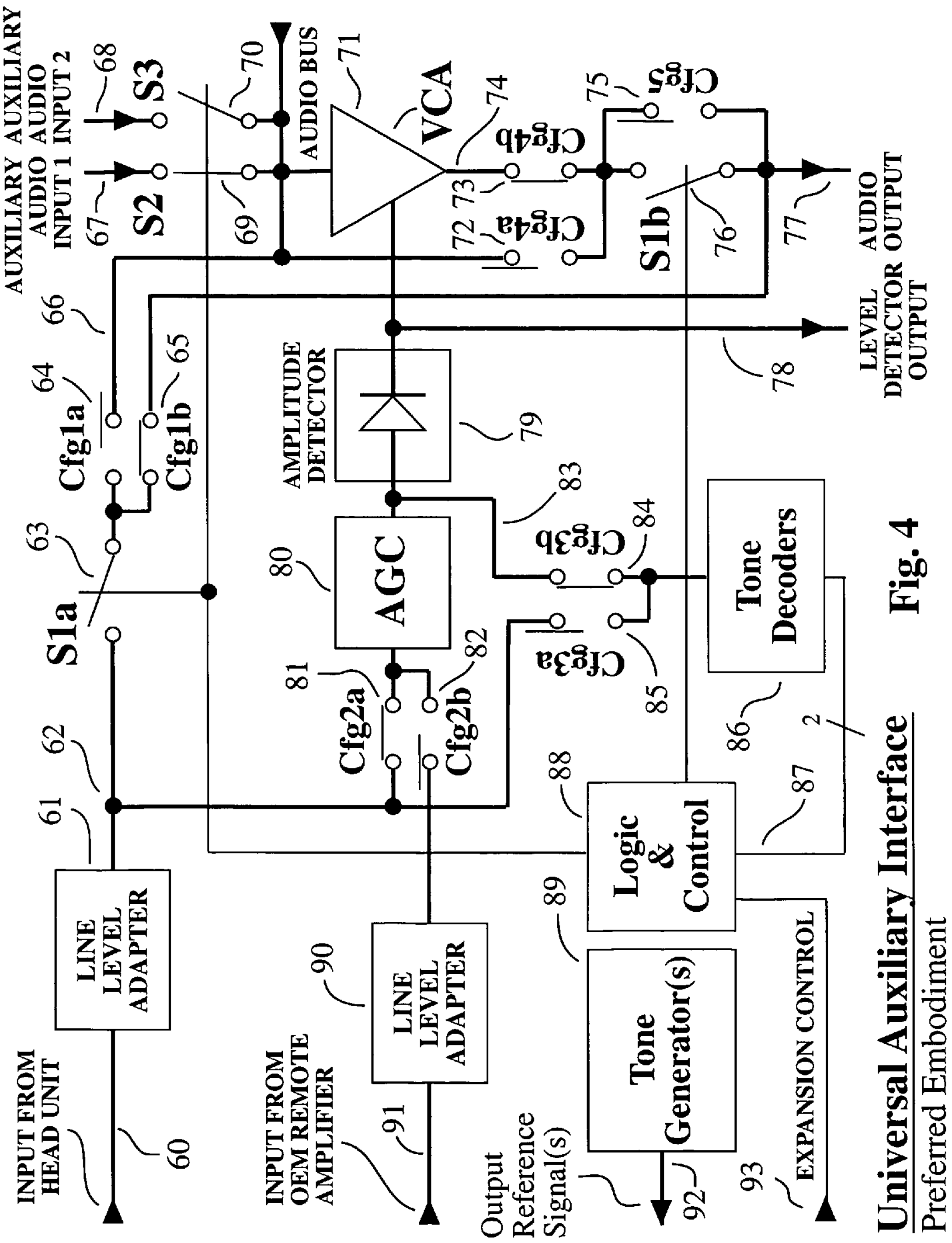
FIG. 4 illustrates the invention as applied to equipping an OEM car stereo with the ability to select at least one additional auxiliary input signal and provide for at least the adjustment of signal level according to the audio volume specified by the use of the volume control of the OEM car stereo.

The present invention is disclosed with reference to the enclosed figures which the same numbers are used where applicable. Because the FIG. 4 illustration of the preferred embodiment of this invention can be configured for three basic configurations, the detailed description of the preferred embodiment can best be served by first providing a detailed description of each configuration one at a time. The detailed description of the preferred embodiment will then be completed with details related to the configuration of the preferred embodiment to realize each of the three basic configurations provided for by the preferred embodiment.

Figure 1:
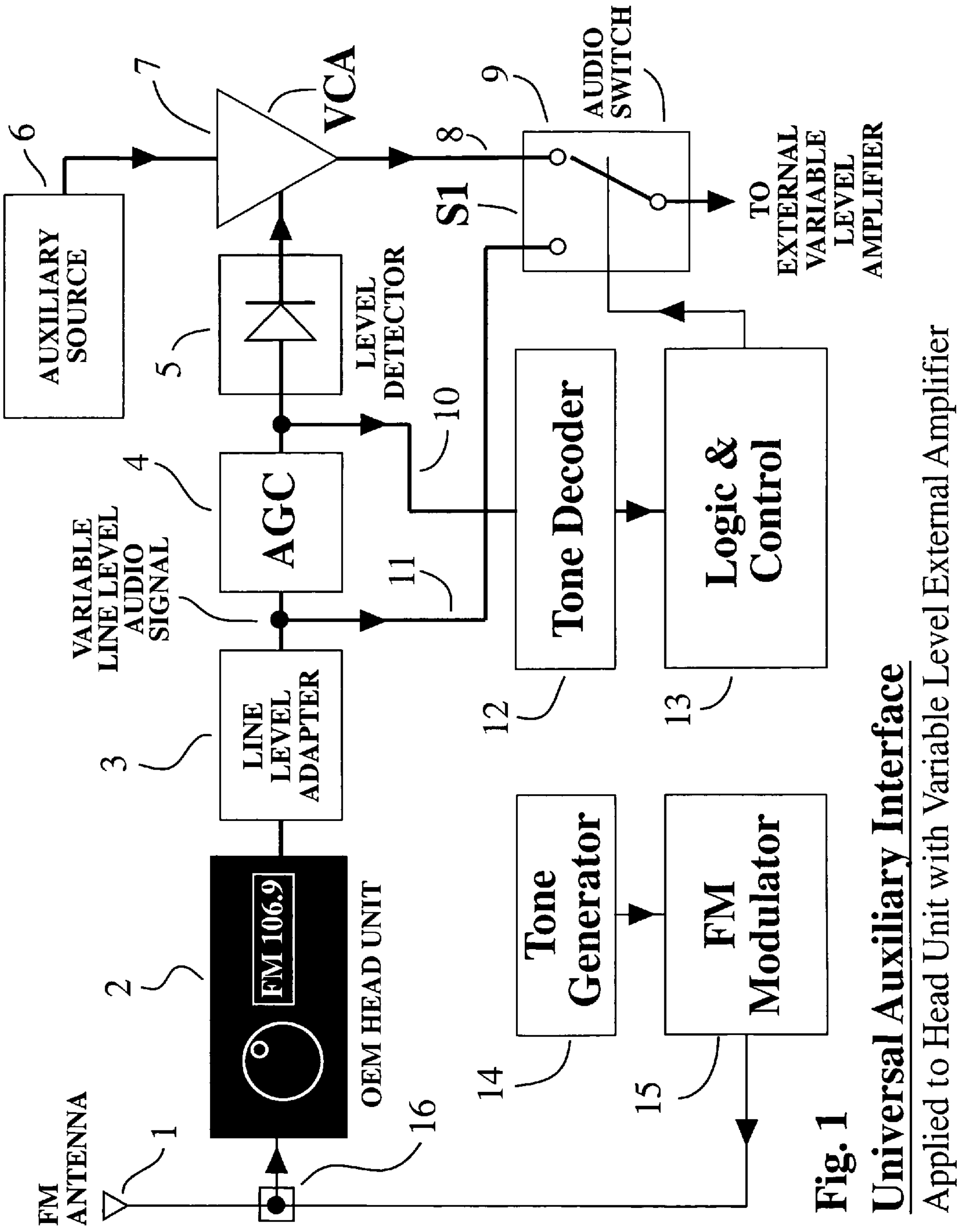
FIG. 1 illustrates the interface as applied to the type of OEM head unit that provides an output signal that is expressed with respect to a variable reference level that is specified by its volume control.

FIG. 1 illustrates the application of the interface device according to this invention as applied to a subject system consisting of an automobile OEM head unit 2 that provides easy access to a signal that varies in accordance with its volume control. The subject system in this instance also includes a fixed gain external amplifier that is intended to work with a signal conveyed to it that is expressed with respect to a variable level in accordance with the volume control of the head unit.

Tone generator 14 develops a special audio frequency signal which is used to develop an FM radio compatible radio signal with modulator 15. This FM radio signal is added to other radio signals delivered by antenna 1 with radio antenna device 16.

A tone of the correct frequency will be received by OEM head unit 2 in this instance only when the audio system user selects the FM radio frequency used by FM modulator circuit 15. When this tone is demodulated by the receiver function of OEM head unit 2, the special signal provided by circuit 14 will be delivered to the line level adapter circuit 3. The signal developed at the output of line level adapter 3 is then subject to the action of the automatic gain control (AGC) circuit 4 to reproduce the special signal originally provided by circuit 14 with sufficient level to enable the special signal detection capabilities of tone decoder 12. This AGC is necessary in connection with this type of OEM head unit because the signal level provided by such OEM head units is subject to their audio system volume control function. AGC circuit 4 is also employed to provide preamplifier gain to enable the operation of level detector 5 over the full range of possible signal levels.

Information about the gain actually applied to the signal in the AGC circuit may be used to supplement the results of the level detector stage to develop a useful signal indicative of the reference level used by the OEM head unit over the full range of signal levels it supplies in practical operation. Typical level detecting circuits cannot operate over the very large range of signal levels such OEM head units are typically able to supply on account of the exponential nature of their controls. The preferred embodiment of this invention employs an analog AGC circuit that controls its gain in an exponential fashion. Accordingly, an analog signal that is logarithmically related to the actual gain applied is available. The preferred level detector circuit 5 then adds the logarithmic transform of the signal level of the special signal after the AGC action, and the result is a logarithmic representation of the original level provided by the OEM head unit that is sufficiently accurate over the full range of useful level adjustment that may be applied by the OEM head unit for the control of the audio system volume.

When tone decoder 12 detects the presence of the special signal it is designed to exclusively detect, logic and control circuit 13 then directs audio switch S1 to substitute the constant level auxiliary source signal 6 by way of Voltage Controlled Amplifier (VCA) 7 to an external fixed gain amplifier. In this way the auxiliary source signal is then used to supply the audio system speakers instead of the special signal received by the OEM head unit. Then, while the auxiliary source is played through the audio system, the results of the level detection of the special signal carried out by the action of AGC 4 in conjunction with level detector 5 is then applied as the control signal that determines the gain of Voltage Controlled Amplifier (VCA) reference level that the auxiliary source signal is subject to before being delivered to the external variable level amplifier. By using a VCA that responds in an exponential fashion to its gain control input, the signal delivered to the external variable level amplifier can be delivered in accordance with the same reference level as the signal output of the OEM head unit. This results in the application of a volume control function that will be indistinguishable in action to that the head unit normally applies as a function of its volume control, yet none of the circuits in the OEM head unit actually operate on the auxiliary signal.

The end result of all the circuits in FIG. 1 is that of permitting the automobile driver's selecting Auxiliary Source 6 whenever the FM receiver is tuned to receive the special FM modulated signal. Moreover, as the volume control of the OEM head unit is operated while the auxiliary source is selected, the volume of the signal developed by the interface device will be developed with respect to a level that matches the level specified by the OEM head unit volume control. In this way the FM receiver capabilities of the OEM head unit are used to select an auxiliary source, while the volume control effect of the OEM head unit are applied by circuitry that is part of the present interface device instead of the circuitry that is used by the OEM head unit to effect changes in volume. As a result electronics with superior characteristics may be employed to develop an audio signal of higher fidelity than the OEM head unit is able to supply.

When other sources are selected by use of the OEM head unit that do not result in the production of the special signal tone detector 12 is sensitive to, audio switch 9 will be commanded by logic and control circuit 13 to connect the external variable level amplifier directly to the output of line level adapter 3. This connection will then result in the audio system playing whatever signal the OEM head unit normally supplies. Signals from other FM or AM radio stations or signals from other sources such as a CD changer or a satellite radio station may then be selected according to the normal capabilities of the OEM head unit used.

Figure 2:
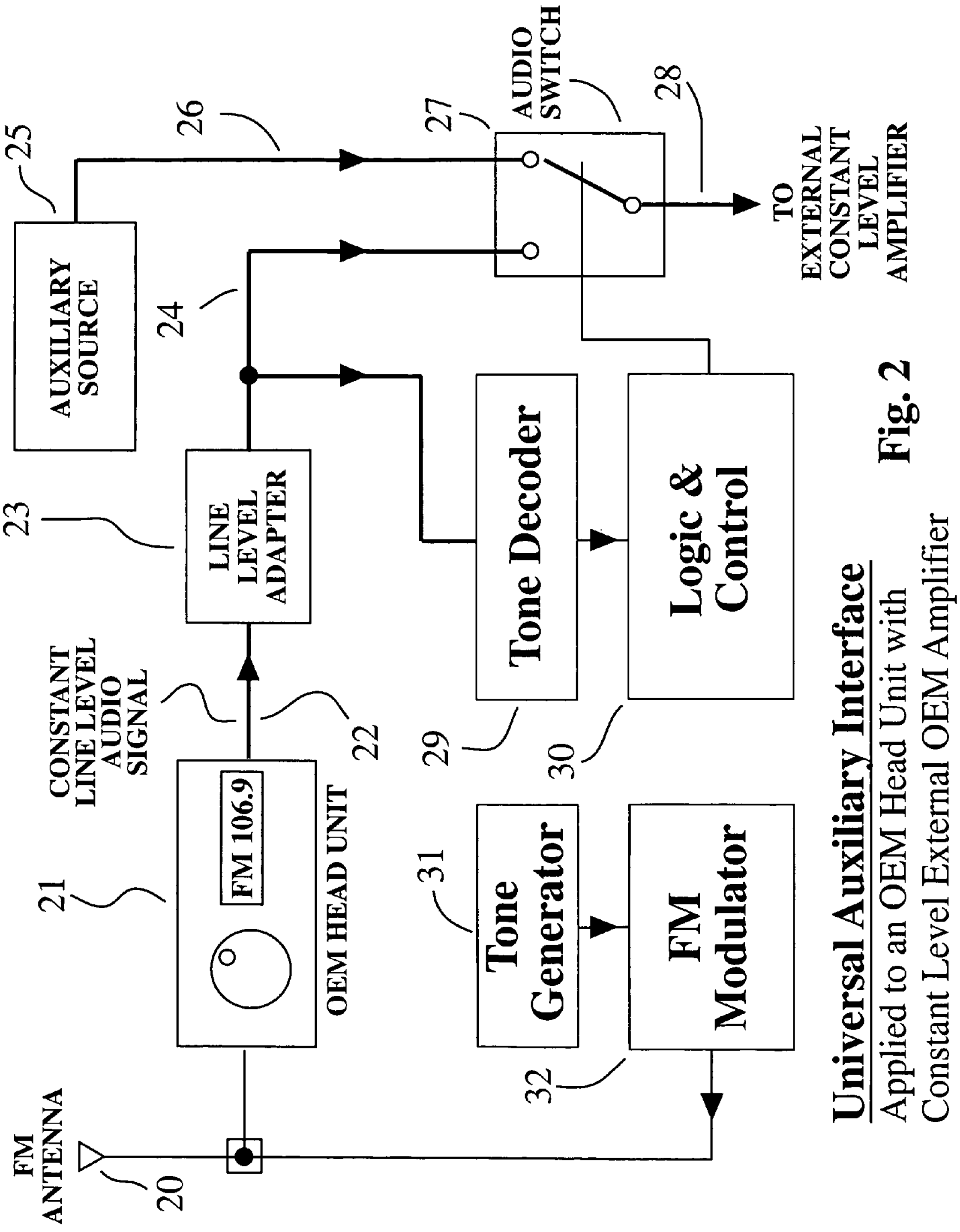
FIG. 2 illustrates the interface as applied to the type of OEM head unit that provides an output signal that is expressed with respect to a constant reference level.

FIG. 2 illustrates the application of the interface device according to this invention as applied to a subject system consisting of an automobile OEM head unit 21 that provides easy access to a signal that does not vary in accordance with its volume control and so provides a signal that is expressed with respect to a constant level. Because the remote amplifier provided for powering the audio speakers in such OEM audio systems is responsible for signal level control and powering the speakers, no signal level determination or electronic volume control circuit such as a VCA is required to carry out this invention. The interface circuit in this case, just as in the FIG. 1 scenario, provides an FM radio signal that delivers the special signal generated by tone generator 31 to the OEM head unit 21. This is done so that when the user selects this FM radio signal the special signal will be demodulated by the OEM head unit's FM radio receiver circuitry and provide the special signal at its output 22. Line level adapter 23, if necessary, buffers and/or scales the signal and provides it to tone decoder 29. Then, when tone decoder 29 detects the presence of the special signal it causes logic & control circuit 30 to switch audio switch 27 to select the constant level auxiliary source signal 26 from auxiliary source 25 instead of the normal fixed level signal provided by the OEM head unit via adapter circuit 23. The result is that the remainder of the OEM audio system then plays the signal produced by the auxiliary source device 25 in exactly the same way that it plays its normal signals.

Then, when the user selects another radio station or any signal source that does not result in the appearance of the special signal tone decoder 29 is sensitive to, the tone decoder circuit 29 will signal the absence of the special signal to the logic and control circuit 30. With the indication that a different source was selected by the user, the logic and control circuit 30 then directs audio signal switch 27 to connect the normal signal provided by the OEM head unit instead of the auxiliary source signal to the OEM external constant level amplifier. This connection will then result in the audio system playing whatever signal the OEM head unit normally supplies according to its normal capabilities and features.

Figure 3:
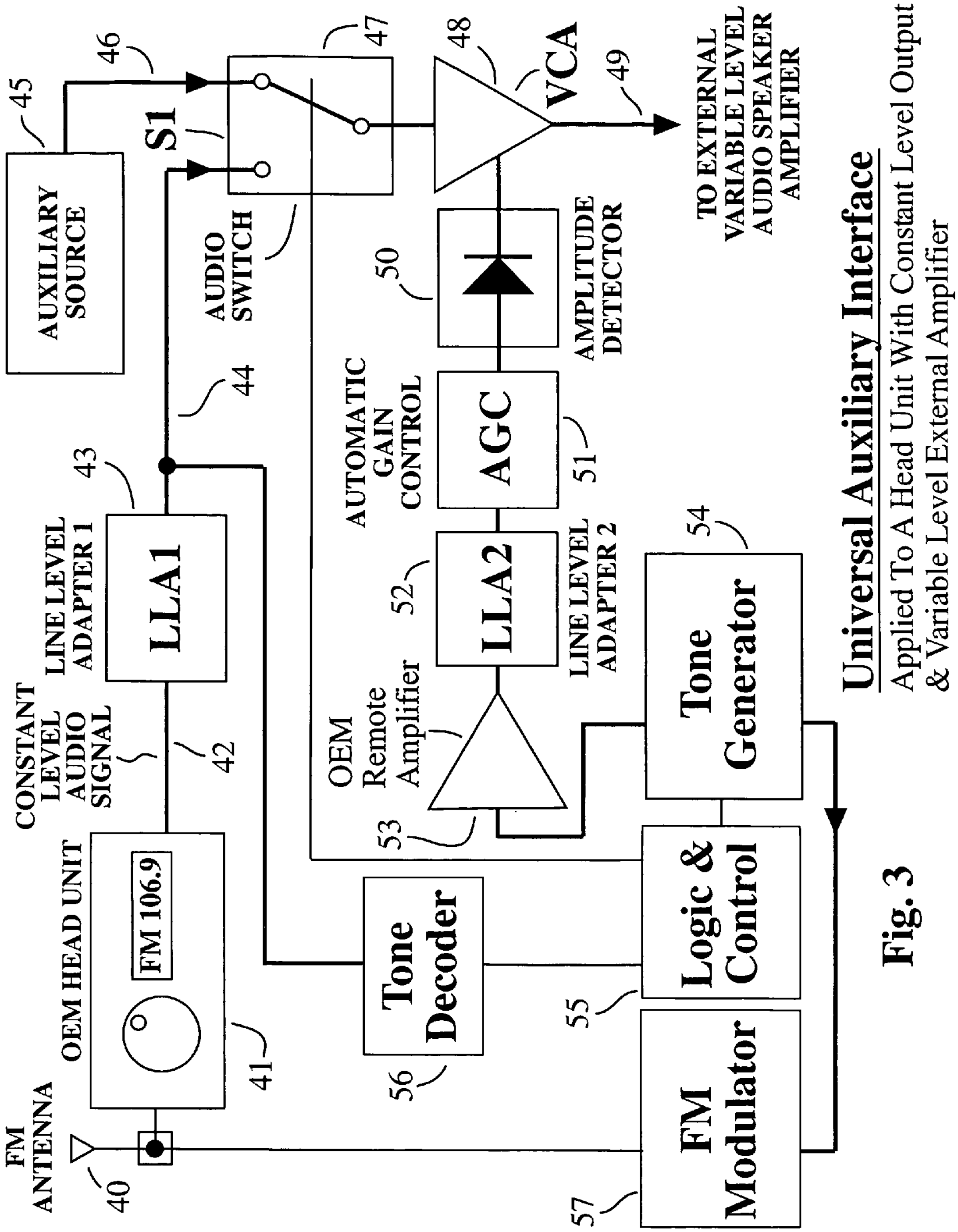
FIG. 3 also illustrates the interface as applied to the same type of OEM head unit that provides an output signal that is expressed with respect to a constant reference level.

Like FIG. 2, FIG. 3 illustrates the application of the interface device according to this invention as applied to a subject system consisting of an automobile OEM head unit 41 that provides easy access to a signal that is constant in level and that does not vary in accordance with its volume control and so provides a signal that is expressed with respect to a fixed and constant level. FIG. 3 differs from the FIG. 2 interface in that it includes provisions designed to permit using a conventional external amplifier with fixed gain. The FIG. 3 system then develops the variable level signal necessary from the constant level audio signal 42 or the constant level auxiliary audio signal 46 to provide for the control of audio volume in the system.

Tone generator 54 not only provides the special signal used to modulate the FM radio signal in FM modulator 57 with the special signal, but may also be used to provide a signal to that the OEM remote amplifier 53 so that the action of the level control circuitry in the OEM remote amplifier 53 can be characterized. While the same signal developed by tone generator 54 need not be used for both purposes, and other signals tailored for each purpose will be obvious to someone of ordinary skill in the art, this embodiment uses the same signal to economize in the cost of the interface device.

Because the output of the OEM remote amplifier is a signal with the characteristics necessary to drive the vehicle's audio speakers, line level adapter 52 is required to reduce that level to be compatible with AGC circuit 51. AGC circuit 51 in conjunction with amplitude detector 50 is engineered to provide a signal indicative of the reference level used to express the signal processed by OEM amplifier 53. Just as in the FIG. 1 circuit, this conjunction of circuits is used in the preferred embodiment of this invention to develop a signal related to the logarithm of the reference level used by the OEM remote amplifier to provide a useful indication of the reference level over the full range of useful signal level adjustment the OEM remote amplifier develops in practical operation. This logarithmic signal indicating the level is then applied to the gain control input of a voltage controlled amplifier circuit that responds to that signal with an exponential characteristic. This results in the development of a range of level adjustment that is indistinguishable from the action of the OEM remote amplifier, yet none of the circuits in the OEM remote amplifier actually operate on the auxiliary signal. VCA 48 is the only circuit that does actually operate on the auxiliary signal, and it can be engineered to do this with better audio fidelity then the circuitry used in most OEM remote amplifiers.

FIG. 4 is a block diagram of the preferred embodiment that includes all the circuits necessary to implement the three scenarios addressed by the systems illustrated in FIGS. 1 through 3. Each case is implemented in the preferred embodiment by the appropriate configuration of the five sets of jumpers labeled CFG1 through CFG5. Table 1 describes the placement of each configuration jumper required to achieve each of these three basic configurations. In addition, the preferred embodiment of this invention would provide for a method of determining the attenuation of the line level adapter 1.

In addition to the ability to address the three scenarios illustrated in the first three figures, the preferred embodiment allows for the selection of two different audio inputs and also allows includes accommodations for the expansion of the number of different auxiliary inputs. To accommodate more than one auxiliary audio input, the preferred embodiment implements a three way audio source switch with switches 63, 67, 68 and 76 to provide for audio signal switching between the normal signal provided by the head unit 61 and one or more auxiliary input signals. To do this, the preferred embodiment includes an audio signal switch to connect each possible signal source to the source signal audio bus 70 according to the dictates of logic and control circuitry 88.

The preferred embodiment of this invention is also intended to be used in conjunction with external car radio modulators. In particular, FM car radio modulators are ubiquitous and readily available. Therefore, the preferred embodiment of this invention provides only the special signals to be used by such modulators. The logic and control circuitry of this embodiment is also designed to work with a unique special signal tone corresponding to the selection of each auxiliary source to the OEM head unit. It also requires that the each special tone is present in the signal provided by the head unit for the full duration of the time the selection of the corresponding auxiliary source is desired. This means that all possible FM car radio modulators used for this particular embodiment must be continuously transmitting their respective special signals so that in the event the OEM head is made to select any one of them, the resulting received tone signal is continuously present for as long as the OEM head selects it.

TABLE 1

FIG. 4 Configuration Table

| Realized Scenario | OEM System Characterisitcs: Head Unit | OEM System Characterisitcs: Amp | FIG. 4 Configuration Switches: 1a | 1b | 2a | 2b | 3a | 3b | 4a | 4b | 5 |
|---|---|---|---|---|---|---|---|---|---|---|---|
| FIG. 1 | Var. | Var. | Off | On | On | Off | Off | On | Off | On | Off |
| FIG. 2 | Const. | Const. | Off | On | Off | On | On | Off | On | Off | Off |
| FIG. 3 | Const. | Var | On | Off | Off | On | On | Off | Off | On | On |

TABLE 2

FIG. 4 Logic & Control

| Input Conditions | FIG. 4 Audio Signal Switch States: S1a | S1b | S2 | S3 | Expansion Signal Output |
|---|---|---|---|---|---|
| No Tone Detected | On | Off | Off | Off | Off |
| Tone 1 Detected | Off | On | On | Off | On |
| Tone 2 Detected | Off | On | Off | On | On |
| Expansion Signal Detected | Off | On | Off | Off | On |

The expansion signal logic is designed to accommodate the selection of additional auxiliary signal sources by daisy chaining additional interface devices of the kind illustrated in FIG. 4. Through the expansion signal daisy chain, the expansion signal logic collects a signal indicative of the detection of a special signal by any of the connected interfaces. Since all the interfaces share the same audio switching bus, this signal is then used to switch between the common audio switching bus as opposed to the OEM head unit output is connected to.

By connecting the expansion signal input of the first in a daisy chain to the expansion signal output of the next interface device in the daisy chain, the switching facilities of additional interface circuits can be coordinated together in terms of selecting signals to the common audio bus 66. When more than one interface device according to FIG. 4 is incorporated this way, only the first interface device in the chain is connected to the OEM head unit and the speaker amplifier.

Additional FM modulators or other such devices are necessary for delivery the additional special signal tones to the OEM head unit are required to be connected to the additional special signal sources provided by the interface device so that the user can select among them. Provisions are therefore provided for programming the frequency of each of the special signal tones so that every additional set of auxiliary inputs will have their own unique tone signal.

It is often the case in automotive applications that when multiple separate pieces of equipment are connected to each other that the system will often become susceptible to engine noise interference in the analog audio signal. Such is especially the case when connecting multiple external auxiliary devices to the preferred embodiment of this interface device in addition to the connections between this interface device and the OEM head unit, the external amplifiers, and multiple FM modulators. The reason for this can be traced to the circulation of extraneous noise currents in the signal cables connecting the separate pieces of equipment. The best solution to this problem is the complete signal isolation of the various circuit connections between devices. Such isolation results in the complete elimination of such ground currents since the isolation breaks all such possible current flow pathways and eliminates the possibility of such extraneous noise currents flows. Unfortunately, such complete isolation is usually very expensive. However, in combination with signal isolation technology as is described in U.S. Pat. No. RE37130E, the merits of the various other features of this invention can be fully realized without extraneous engine noise interference, and this can accomplished at low cost.

Accordingly, the preferred embodiment of this invention includes a special power supply circuit that provides a constant current to increase the isolation of its circuits with respect to common mode interference potentials that can cause extraneous ground currents. In this way all common mode interference pathways are isolated without sacrificing the integrity of the differential mode signals conveyed between the circuits of this invention and the various devices it connects to.

It is also important to isolate the individual inputs and the OEM head unit connections from each other so that no more than one signal source ground reference connection is made at any one time. This requires that only one of the input ground reference connections is actually connected at any one time. This preferred method of accomplishing this is the use of signal isolation technique like those exemplified by claim 28 in U.S. Pat. No. RE37130E for each auxiliary input to isolate the ground reference pathway for each auxiliary input from every other circuit in the system. Other methods may also be used to accomplish these ends, such as switching not only the auxiliary signal connections to the input audio bus of the invention, but also switching their associated ground potentials circuits. With such switches only one input ground reference connection would be actually connected at any one time and no extraneous ground loop current flow paths would be possible—except for those the OEM system might have included by some fault in their design. The use of audio isolation transformers and digital optical isolators for all digital signal connections can also accomplish this isolation.

It is also important to keep the digital control and tone signal grounds isolated from the audio signal circuits too. This can be accomplished by such conventional methods as optically isolating all digital connections to deliver all control and switching signals in a way that does not permit any extraneous ground currents to flow in the audio circuits.

The present invention has been described with reference to the above discussed preferred embodiments. It is to be appreciated that the true nature and scope of the present invention is determined with reference to the claims appended hereto.

What is claimed is:

1. An auxiliary interface device, comprising:

an input to interface to the signal output of a signal source apparatus, said signal source apparatus developing, receiving, or able to receive more than one signal, said signal source apparatus providing for the user selection of at least one of the signals in deference to the others so that said signal source apparatus provides for the selection of at least one special signal having predetermined characteristics, a detector which recognizes the presence of the at least one said special signal when present or part of a signal developed by the signal source apparatus to which said auxiliary interface device is connected, said detector being able to distinguish between said at least one special signal and other signals ordinarily provided by the signal source apparatus to which said auxiliary interface device is interfaced, a signal switch and/or selection circuits to substitute at least one auxiliary signal in place of a signal output by the said signal source apparatus to which said auxiliary interface is interfaced, said signal switch and/or selection circuits being configured to substitute said at least one auxiliary signal for the signal normally developed by said signal source apparatus to which said auxiliary interface device is interfaced when said detector recognizes the presence of the at least one special signal in the signal normally developed by said signal source apparatus to which said auxiliary interface device is interfaced.

2. The interface device according to claim 1, whereas said signal switch and/or selection circuits operate to restore said signal normally provided by said signal source apparatus when said detector no longer recognizes the presence of the at least one special signal.

3. The Interface Device, according to claim 1, further comprising:

at least one signal detector capable of estimating at least one parameter of at least one signal altering process applied by said signal source apparatus to which said auxiliary interface device is interfaced; and at least one auxiliary processor to apply a signal altering process to a signal or to said at least one auxiliary signal, said signal altering processing applied having at least one parameter specified in relation to said estimate of the at least one parameter of said at least one signal altering process applied to said signal ordinarily altered by the signal source apparatus to which said auxiliary interface device is interfaced.

4. The Interface Device, according to claim 1, further comprising at least one detector circuit interfaced to said apparatus to which said auxiliary interface device is interfaced, and capable of estimating at least one parameter of at least one signal altering process applied by the signal source apparatus to which said auxiliary interface device is interfaced, whereas said estimate is used to specify a parameter used by an auxiliary device to determine or specify at least one function of said auxiliary device.

5. The Interface Device of claim 1, further comprising a radio frequency transmitter to modulate said special signal in so that it possible for said signal source apparatus, having corresponding radio receiver capability, to receive and select said special signal so modulated.

6. The interface device according to claim 1, further comprising at least one pre-recorded special signal on a recording media for said signal source apparatus to either select or reproduce.

7. The interface device, according to claim 1 further comprising:

a detector circuit to indicate more than one parameter representative of one or more signal altering processes applied by said signal source apparatus; and at least one auxiliary processor able to apply at least one signal altering process to a signal or to said at least one auxiliary signal, said signal altering process being applied in accordance with said more than one parameter.

8. The interface device, according to claim 1, further comprising:

a detector circuit to develop an indication of at least one parameter of at least one signal altering process applied by said signal source apparatus; and a media program selection navigation function responsive to said at least one parameter.

9. The interface device, according to claim 3, further comprising auxiliary processor circuits which respond to the detection of at least one of said parameters as determined while said special signal is present, which then further act upon the signal provided by said signal source apparatus when said special signal is no longer present.

10. The interface device according to claim 1, wherein at least one signal interface carrying signals to or from said signal source apparatus or said auxiliary signal and said interface device further provides ground circuit isolation.

11. The interface device according to claim 10, wherein the at least one signal interface carrying signals to or from said signal source apparatus incorporates at least one buffer amplifier power by a power supply, so as to increase isolation between it and any other connected device, a providing a constant current with respect to differences in common mode voltage potential between the ground reference potential used by said interface device and at least one device to which it is connected.

12. The Interface Device, according to claim 1, further comprising:

a textual information display interface responsive to at least one said special signal that includes textual information.

13. The Interface device comprising:

an input to interface to a signal output of a signal source apparatus, said signal source apparatus generating or receiving a plurality of signals and permitting the user selection of one of those signals, such that said apparatus allows for selection of a plurality of special signals, at least one detector to recognize and distinguish between each of said plurality of special signals to which said auxiliary interface device is interfaced, a plurality of switches and/or selection circuits operate in accordance with said at least one detector configured to substitute at least one auxiliary signal from among a plurality of auxiliary signals according to the presence of the special signals, in place of a signal ordinarily provided by the signal source apparatus to which said auxiliary interface is interfaced, said plurality of switches and/or selection circuits being operated so as to substitute one or more of said plurality of auxiliary signals when said detector recognizes the presence of one or more of said corresponding special signals.

14. The interface device of claim 13, wherein said plurality of switches, and/or selection circuits are operated so as to restore said signal normally developed by the apparatus, in place of said at feast one auxiliary signal when said detector no longer recognizes the presence of the at least one of special signal.

15. The interface device, according to claim 14, wherein at least one function of said auxiliary device is specified in relation to the detection or measurement of at least one of a plurality of special signals.

16. The Interface Device, according to claim 12, wherein said textual information is supplied by a FM radio frequency transmitter in accordance with RDBS FM broadcast standard.

* * * * *